Patented Sept. 16, 1941

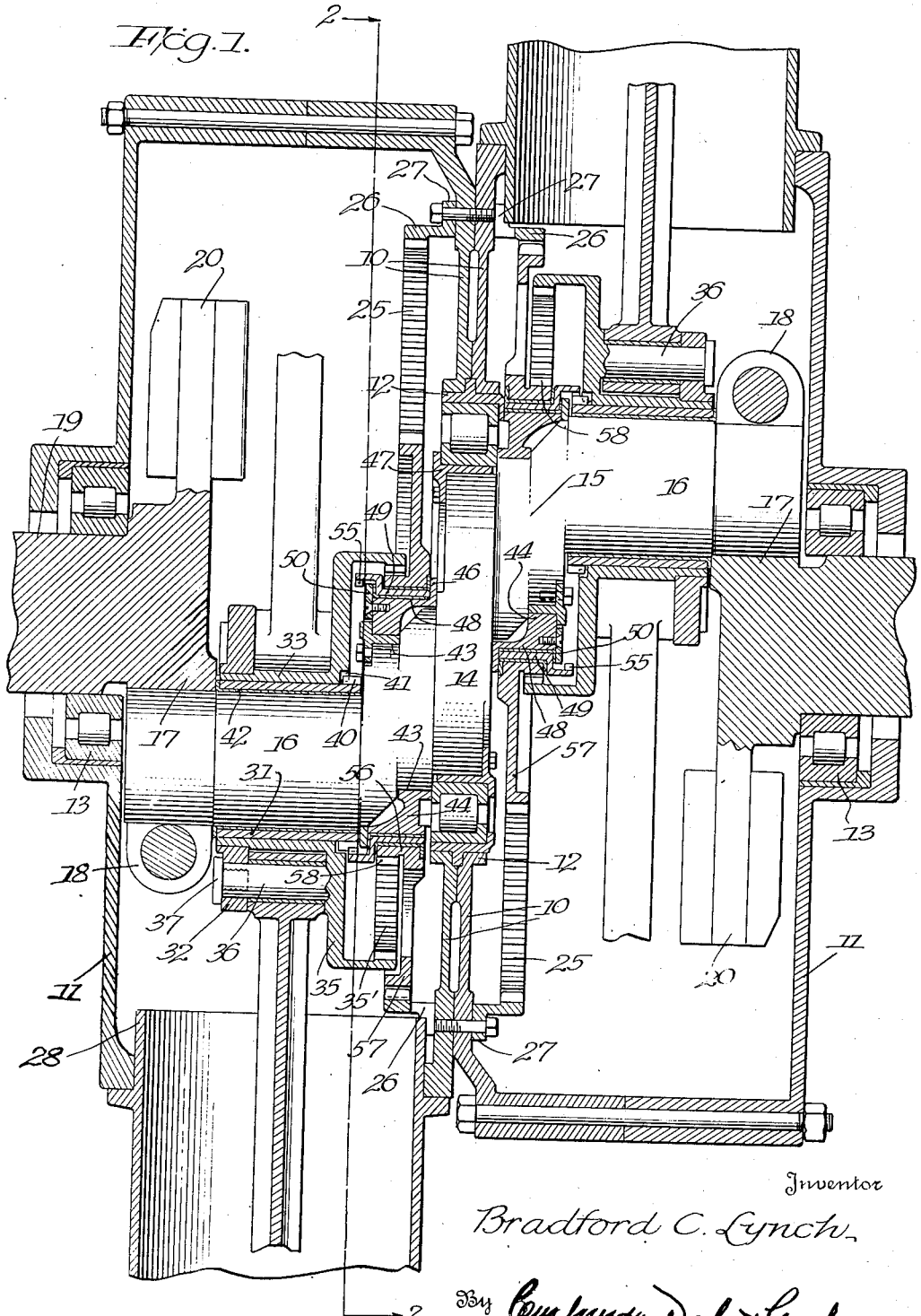

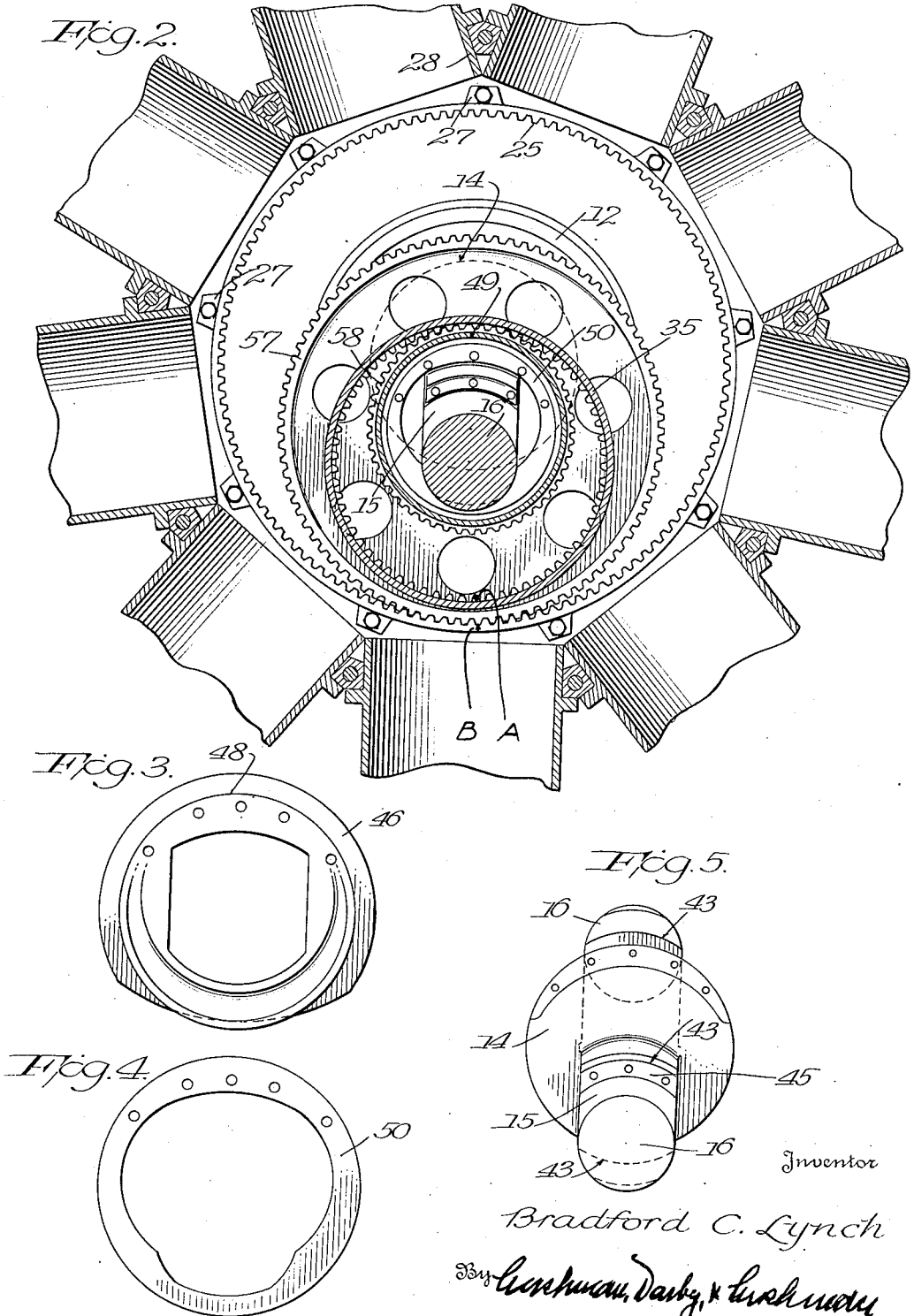

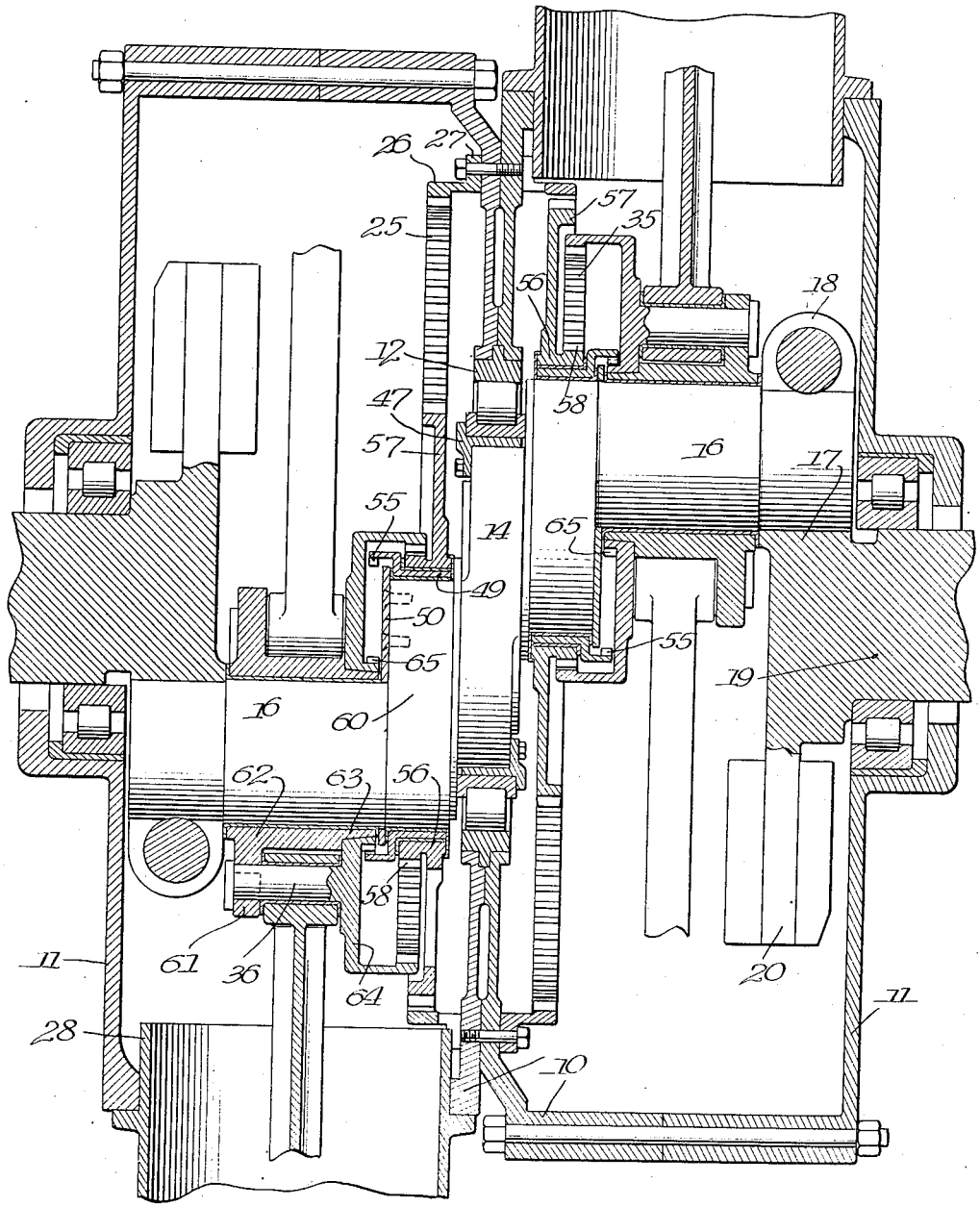

2,256,094

UNITED STATES PATENT OFFICE 2,256,094

AIRPLANE ENGINE

Bradford C. Lynch, Paterson, N. J.

Application October 1, 1938, Serial No. 232,887

4 Claims. (Cl. 123—55)

This invention relates to a radial engine construction and more particularly to a mechanism for interconnecting the pistons and crank shaft to obtain uniform piston rod motion. In the past, it has been the practice to provide a master rod construction to control the motion of the spool to which the piston rods are connected. It is the particular object of this invention to provide a simple means to avoid the vibrating and unbalanced forces set up by this type of prior art structure.

Figure 1 is a sectional elevation through a two row radial engine,

Figure 2 is a sectional view taken on line 2—2 of Figure 1,

Figure 3 is a front view of the journal,

Figure 4 is a front view of the spacing ring,

Figure 5 is an end view of the center portion of the crank shaft, and

Figure 6 is a sectional elevation showing a modified structure.

In the present disclosure, the mechanism has been incorporated in a two row radial engine. However, it will be apparent from the description that the mechanism could readily be designed into a single row engine or an engine having two or more than two rows. In the form herein shown the mechanism is duplicated in each row and therefore only the structure in one row will be described.

The engine here shown includes two crankcases having their inner walls bolted together, each crank-case is made of two parts 10 and 11 suitably bolted together. The cylinders of each row are disposed about the periphery of their respective crank-cases, and are offset circumferentially with respect to each other, as is conventional practice. In a 4 cycle air cooled engine the central portion of the composite crank-case is provided with a suitable bearing mounting 12 for supporting the crank-shaft, the mounting being concentric with the axis about which the cylinders radiate. The crank-shaft is supported in the outer walls of the composite crank-case by bearings 13. (For the purposes of clarity the center partition of the composite crank-case will be spoken of as the inner portion of the motor and moving in either direction toward the other walls will be spoken of as moving toward the outer portion of the motor.)

The crank-shaft herein shown includes a central bearing portion 14 having two crank-arms 15 integrally formed therewith. The crank-arms extend in opposite directions and are integral with the two crank-pins 16. The crank-arms 17 at the outer ends of the crank-shaft are detachable from the crank-pins by means of a clamp joint and bolt construction 18. The detachable crank-arm is formed integral with the outer bearing journal 19 of the crank-shaft and the counter weight 20. The crank-shaft is mounted in the crank-case centrally in a roller bearing and is supported at its outer ends by other roller bearings. This construction is conventional practice.

The inner or center partition of the crank-case supports an internal gear 25 which is formed with extending lugs 26 that have suitable feet 27 for bolting the gear to the crank-case. The internal gear is fixedly mounted on the crank-case by bolts that pass through the feet and through the two center sections of the crank-case, which bolts also serve to hold the two sections of the crank-case together. These bolts are positioned between each of the cylinders as shown in Figure 2. In the preferred construction the diameter of the internal gear fixed to the crank-case is such that, when mounted, it will just fit within the skirts 28 of the cylinders disposed about the periphery of the crank-case. However, any diameter may be selected provided it can be worked into the gear train as will appear more fully below.

Pistons reciprocate within the cylinders and have their piston rods pivotally connected at equally spaced intervals to a spool mounted on the crank-pin 16. The spool is adapted to rotate relative to the crank-pin and is mounted on the pin with a liner 31 interposed between the pin and the spool. In order to facilitate assembly the spool is made in two parts, a body portion and a removable flange 32, the body portion having a cylindrical base 33 which is provided with a seat 34 around its outer end and an integral flange 35, the removable flange 32 seating on the outer end of the cylindrical base on the seat 34 there provided. The flange 35 integral with the base portion 33 has an internal gear 35' on its inner face and suitable pins 36 on its outer face which are supported at their opposite ends by the removable flange. One pin is provided for each cylinder in the row and each of the piston rods are pivotally connected to their respective pins. The internal gear and pins may be and preferably are integral with the inner flange 35 of the spool. The outer removable flange is held in place by bolts 37 which threadedly engage in the ends of the pins.

The interposed liner 31 has spur gear teeth 40 formed on its inner end and a portion of the spur gear teeth cooperate with the broaching 41 formed in the flange of the body of the spool, so that the liner and the spool are locked and turn together about the crank-pin 16. The liner has a bearing material 42 spun about its inner diameter and flared out about its outer end to provide a bearing surface between the rotating spool and the crank-pin and between the removable or outer crank-arm.

The inner crank-arm 15 is provided with seating portions 43 upon which a journal 44 is mounted. The journal is moved into position and then fixedly mounted on the crank-arm by means of a spacer 45 which is bolted onto the cheek of the crank-arm. The journal is provided with an integral thrust flange 46 on its inner side, which flange is cut away, as shown in Figure 3, in order to provide a clearance between the flange and the spacer 47 which holds the center roller bearing for the crank-shaft in position. The journal is provided with a bearing surface 48 about its periphery and a liner 49 is held in position axially on this bearing surface by a spacer ring 50. The spacer ring is fixedly secured to the outer face of the journal by suitable screws to hold the liner on the journal.

An internal gear 55 is formed integral with the liner 49 and extends beyond the plane of the thrust ring, which gear cooperates with the spur gear teeth formed on liner 31. The liner 49 has a bearing material spun onto the contacting surface between the liner and the journal and the bearing material is flared up onto the outer face of the liner to provide a bearing metal surface between the moving parts. The liner 49 is provided with a bearing surface for the idler gear 56 so that the idler gear is carried around by the inner crank-arm as the crank-shaft rotates. The idler gear has a large spur gear section 57 that meshes with the internal gear 25 fixed to the crank-case and a small spur gear portion 58 that meshes with the internal gear 35 integral with the spool, thus forming an epicyclic train. The idler gear is provided with bearing metal between its hub and the liner 49 with respect to which it moves.

A modified form of the invention is shown in Figure 6. In this disclosure instead of a journal being removably mounted on the inner crank-arm, this crank-arm has a bearing 60 machined onto it. The liner 49 and idler 56 are mounted on bearing 60 in the same manner as described with respect to the journal. A modification of the spool structure is also here shown. In this disclosure the outer flange 61 and cylindrical bearing portion 62 of the spool are formed integral, the inner end of the bearing portion being tapered as at 63. The inner flange 64 of the spool has the internal gear 35 and pins 36 integral therewith and also has spur gear teeth 65 disposed about its inner periphery. The spur gear teeth 65 mesh with the internal gear teeth 55 provided on liner 49. The rest of the structure with the exception of the center crank-shaft bearing of this modification is the same as that previously described and operates in the same way as will appear below. The bearing is provided with a race way fixedly mounted between the center portions of the separate crank-cases and another race having outwardly turned flanges that is mounted on the center bearing of the crank-shaft as shown in Figure 6.

The structure thus far described would be operative to control the spool motion in a single row engine. In its preferred form the mechanism has been designed into a two row engine and the structure just set forth is duplicated in the other row. The duplicated structure is assembled on the opposite side of the center partition of the composite crank-case and on the oppositely disposed center crank-arm. The operation of the mechanism is exactly the same for each row and is as follows:

Assuming that the crank-shaft is driven in a positive direction when the engine is started, as the crank-shaft rotates, the idler gear 56 carried on the inner crank-arm is driven in a negative direction because of the cooperation between the internal gear 25 fixed to the crank-case and the large spur gear 57 of the idler. The small spur gear 58 of the idler meshing with the internal gear 35 on the spool, drives the spool in a negative direction and thus the spool is caused to rotate in a direction opposite to the direction of rotation of the crank-shaft and crank-pin 16 upon which it is mounted. The spool is mounted for rotary movement on the crank-pin but has an orbital path in the crank-case. The ratio of the gear train is one to one so that the spool is driven negatively one revolution for every positive revolution of the crank-shaft and crank-pin. In this manner a vertical center line drawn on the face of the spool will remain vertical throughout the entire operation of the engine. When the motion of the spool is thus controlled each piston rod exerts its thrust against the crank-pin at the same angle and makes for a smoother operation of the motor.

The intergearing of liners 31 and 49 is an important feature of this invention. The liner 31 is locked to the spool and drives liner 49 through its internal gear 55. The internal gear being of larger diameter than the spur gear on liner 31 the liner 49 is driven at a slower R. P. M. than the spool. The purpose of this is to reduce the relative linear speed between the bearing on the idler gear and the journal. It will be appreciated that the higher the linear speed between the bearing surfaces the more wear there will be on the bearing. If the idler gear were made to bear directly on the journal a certain linear speed would result between the bearing and the journal which in certain high speed engines might be prohibitory. However if the present construction is used the liner 49 may be driven at, for example, one-half the R. P. M. of the idler, yet the liner may still be running faster than the journal. In this manner the linear speed between the idler and liner may be controlled and maintained within proper limits and the linear speed between the liner and the journal is controlled so that no excessive bearing speeds are encountered.

In the modified construction shown in Figure 6 the liner 49 and idler 56 carried on bearing 60 on the inner crank-arm cooperate with the other elements of the mechanism exactly as described above. In this instance, however, liner 49 is driven through the internal gear teeth 55 which mesh with spur gear teeth 65 provided on the inner flange of the spool.

The above described mechanism may be incorporated in the conventional radial engine with a minimum of redesigning, the usual accessories may be mounted at the rear and the reduction gearing and propeller at the front, a slight modification of the spool and crank-shaft being all that is required. It is understood that all the parts will be lubricated in a conventional manner and the structure will be lightened wherever possible.

The spool being intergeared with the crank-case provides a convenient means for assembling the pistons in correct cyclic relation to the cylinders. The spool gear may be provided with an arrow or other mark A which is adapted to be lined up with mark B on the crank-case gear. In assembling the motor the two marks are brought into line and the gear train is then compelted to lock the pistons in proper relation with the cylinders. If desirable the gear fixed to the crank-case may be provided with means to adjust it rotatively about its axis to change the relation slightly. However, in the preferred construction no such adjusting means has been found necessary. This construction further provides a means to adjust the torque acting on the spool and gear train, either of the above methods or merely stepping the gear train around one tooth more or less may be used to change the angularity of the piston rod on the power stroke to control the torque.

While the invention has been described in connection with a radial airplane engine construction, it is intended that the present mechanism may be used in any device where a "master rod" construction is used. The present invention may be readily adapted to use in a radial type compressor engine or in an engine construction wherein the crank-shaft is held stationary and the cylinders and crankcase may revolve, i. e., in a rotary engine. Other uses may occur to those skilled in the art, e. g., in certain types of gas or air meters or machine mechanism wherein it is desirable to change from rotary to or from oscillating motion such as a piston rod motion, or to drive two members rotating on eccentric shafts or to drive a member controlling reciprocating units so as to have a uniform motion with respect to an eccentrically located and relatively stationary member, all of which are comprehended within the scope of the following claims.

I claim:

1. In a two row radial engine construction the combination including a composite crank-case, cylinders disposed about the periphery of said composite crank-case in offset relation, a crank-shaft rotatably mounted in said crank-case, said crank-shaft having a separate crank-pin for each row of said engine, a crank-arm for each crank-pin, pistons reciprocating in said cylinders, piston rods operatively connecting said pistons to said separate crank-pins, a spool interposed between said piston rods and each of said crank-pins, a gear fixed on each side of the center portion of said crank-case, a gear fixed on each of said spools, an idler gear on each of said crank-arms, each of said idler gears cooperating with its respective crank-case gear and spool gear, each of said gear trains being adapted to drive its respective spool negatively one revolution for each revolution of said crank-shaft makes in a positive direction.

2. In a two row radial engine construction the combination including a composite crank case having a center partition, cylinders disposed about the periphery of said composite crank case in offset relation, a crank-shaft rotatably mounted in said crank case, pistons reciprocating in said cylinders, piston rods operatively connecting the pistons in each row to said crank-shaft, a spool interposed between each row of said piston rods and said crank-shaft, a gear fixed on each side of the center partition of said crank-case, a gear fixed on each of said spools, intergearing means forming a gear train between each of said corresponding crank-case and spool gears, said gear trains each including an internal gear, and each of said gear trains being adapted to drive its respective spool negatively one revolution for each revolution said crank-shaft makes in a positive direction.

3. In a two-row radial engine construction the combination including a composite crank-case, cylinders disposed about the periphery of said composite crank-case in offset relation, a crank-shaft rotatably mounted in said crank-case, said crank-shaft having a separate crank-pin for each row of said engine, a crank-arm for each crank-pin, pistons reciprocating in said cylinders, piston rods operatively connecting said pistons to said separate crank-pins, a spool interposed between said piston rods and each of said crank-pins, an internally geared flange on each of said spools, a gear fixed on each side of the center portion of said crank-case, a gear fixed on each of said spools, an idler gear on each of said crank-arms, each of said idler gears cooperating with its respective crank-case gear and geared flange, each of said gear trains being adapted to drive its respective spool negatively one revolution for each revolution of said crank-shaft makes in a positive direction.

4. In a two-row radial engine construction the combination including a composite crank-case, cylinders disposed about the periphery of said composite crank-case in offset relation, a crank-shaft rotatably mounted in said crank-case, said crank-shaft having a separate crank-pin for each row of said engine, a crank-arm for each crank-pin, pistons reciprocating in said cylinders, piston rods operatively connecting said pistons to said separate crank-pins, a spool interposed between said piston rods and each of said crank-pins, a flange on each of said spools, an internal ring gear associated with each of said flanges, a gear fixed on each side of the center portion of said crank-case, a gear fixed on each of said spools, an idler gear on each of said crank-arms, each of said idler gears cooperating with its respective crank-case gear and ring gear, each of said gear trains being adapted to drive its respective spool negatively one revolution for each revolution of said crank-shaft makes in a positive direction.

BRADFORD C. LYNCH.